United States Patent
Mutoh

(10) Patent No.: US 9,882,751 B2
(45) Date of Patent: Jan. 30, 2018

(54) COMMUNICATION SYSTEM, COMMUNICATION CONTROLLER, COMMUNICATION CONTROL METHOD, AND MEDIUM

(71) Applicant: FUJITSU LIMITED, Kawasaki-shi, Kanagawa (JP)

(72) Inventor: Ryoichi Mutoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 625 days.

(21) Appl. No.: 14/100,564

(22) Filed: Dec. 9, 2013

(65) Prior Publication Data

US 2014/0237136 A1    Aug. 21, 2014

(30) Foreign Application Priority Data

Feb. 21, 2013   (JP) ................................. 2013-032646

(51) Int. Cl.
*H04L 25/20* (2006.01)
*H04L 12/26* (2006.01)
*H04L 12/24* (2006.01)
*H04L 12/819* (2013.01)

(52) U.S. Cl.
CPC .......... *H04L 25/20* (2013.01); *H04L 41/0896* (2013.01); *H04L 43/0882* (2013.01); *H04L 47/215* (2013.01); *H04L 43/16* (2013.01)

(58) Field of Classification Search
CPC . H04L 25/20; H04L 41/0896; H04L 43/0882; H04L 43/16; H04L 47/215
See application file for complete search history.

(56) References Cited

U.S. PATENT DOCUMENTS

| 6,137,944 A * | 10/2000 | Murakami | G11B 5/86 386/201 |
| 6,253,093 B1 * | 6/2001 | Yoshikawa | H04L 1/004 455/556.1 |
| 6,694,104 B1 * | 2/2004 | Caplan | H04B 10/505 375/300 |
| 7,362,779 B1 * | 4/2008 | Zabezhinsky | H04J 3/1611 370/512 |
| 7,369,496 B1 * | 5/2008 | Wiggins | H04L 12/4013 370/235 |

(Continued)

FOREIGN PATENT DOCUMENTS

| JP | 9-238141 | 9/1997 |
| JP | 2006-74773 | 3/2006 |

(Continued)

OTHER PUBLICATIONS

Japanese Office Action dated Aug. 23, 2016 in corresponding Japanese Patent Application No. 2013-032646.

*Primary Examiner* — Uzma Alam
(74) *Attorney, Agent, or Firm* — Staas & Halsey LLP

(57) ABSTRACT

A communication system includes a transmitter configured to transmit a packet, a repeater configured to impose a bandwidth limit on the packet, a receiver configured to receive the packet on which the bandwidth limit is imposed, and a control device configured to set, when a reception interval of reception packets received by the receiver is longer than a transmission interval of packets transmitted to the repeater, a transmission rate in the transmitter in accordance with the reception interval.

17 Claims, 12 Drawing Sheets

(56) References Cited

U.S. PATENT DOCUMENTS

| | | | | |
|---|---|---|---|---|
| 8,160,863 | B2* | 4/2012 | Zeidman | G06F 17/5022 370/232 |
| 9,118,586 | B2* | 8/2015 | Dropps | H04L 49/357 |
| 2001/0026150 | A1* | 10/2001 | Klenner | H04L 1/20 324/76.26 |
| 2002/0046264 | A1* | 4/2002 | Dillon | H04B 7/18584 709/219 |
| 2003/0189947 | A1* | 10/2003 | Beshai | H04L 47/10 370/428 |
| 2005/0254456 | A1* | 11/2005 | Sakai | H04L 1/0041 370/328 |
| 2006/0045023 | A1 | 3/2006 | Kim et al. | |
| 2006/0072613 | A1* | 4/2006 | Kwon | H04L 1/0002 370/473 |
| 2006/0080459 | A1* | 4/2006 | Nanri | H04L 1/0025 709/237 |
| 2006/0171713 | A1* | 8/2006 | Feng | H04J 14/0227 398/69 |
| 2006/0176832 | A1* | 8/2006 | Miceli | H04L 1/0002 370/260 |
| 2007/0133446 | A1* | 6/2007 | Yoon | H04L 1/0026 370/310 |
| 2008/0025172 | A1* | 1/2008 | Holden | G06F 3/16 369/47.35 |
| 2008/0026797 | A1* | 1/2008 | Nanda | H01Q 1/246 455/562.1 |
| 2009/0080334 | A1* | 3/2009 | DeCusatis | H04L 47/10 370/237 |
| 2009/0161569 | A1* | 6/2009 | Corlett | H04L 43/08 370/252 |
| 2009/0163254 | A1* | 6/2009 | Chandra | H04L 65/604 455/574 |
| 2010/0254679 | A1* | 10/2010 | Sasaki | G11B 20/00173 386/341 |
| 2010/0329364 | A1* | 12/2010 | Giombanco | H04B 1/16 375/258 |
| 2011/0066822 | A1* | 3/2011 | Ikeda | G06F 13/4059 711/170 |
| 2011/0211469 | A1* | 9/2011 | Miyazawa | H04L 43/0876 370/252 |
| 2011/0252055 | A1* | 10/2011 | Cuzacq | G06F 17/30017 707/770 |
| 2012/0063307 | A1* | 3/2012 | He | H04W 74/0841 370/230 |
| 2012/0093500 | A1* | 4/2012 | Shiba | H04J 14/0246 398/25 |
| 2012/0207245 | A1* | 8/2012 | Hamaguchi | H04H 20/16 375/316 |
| 2013/0067524 | A1* | 3/2013 | Andrews | H04N 21/23436 725/109 |
| 2013/0138830 | A1* | 5/2013 | Fang | H04L 47/263 709/233 |
| 2013/0310959 | A1* | 11/2013 | Sandu | G10L 25/60 700/94 |
| 2014/0118469 | A1* | 5/2014 | Gwilt | H04M 7/0027 348/14.08 |

FOREIGN PATENT DOCUMENTS

| | | |
|---|---|---|
| JP | 2011-182015 | 9/2011 |
| JP | 2012-5087 | 1/2012 |

* cited by examiner

COMMUNICATION SYSTEM, COMMUNICATION CONTROLLER, COMMUNICATION CONTROL METHOD, AND MEDIUM

CROSS-REFERENCE TO RELATED APPLICATION

This application is based upon and claims the benefit of priority of the prior Japanese Patent Application No. 2013-032646, filed on Feb. 21, 2013, the entire contents of which are incorporated herein by reference.

FIELD

The embodiment discussed herein is related to a communication system, a communication controller, a communication control method, and a medium.

BACKGROUND

An enormous amount of data is accumulated everyday all over the world to accelerate the creation of big data, and some systems used for processing big data are constructed over a plurality of bases in overseas locations accompanied by long-distance communication. The amount of time for data transfer via a network between locations is thus not ignorable.

For example, when communication between locations is executed in accordance with a transport layer protocol (transmission control protocol (TCP)) in order to ensure communication reliability, an ACK packet for use in reception acknowledgement is transmitted, for a packet transmitted from a transmitter, from a receiver. If the ACK packet does not reach the transmitter within a time-out period, communication control for setting the time-out period to a long period and reducing a packet transmission rate is executed in order to reduce a packet loss and congestion. That is, control for reducing a throughput of communication is executed. A delay in a network affects not only a packet transmitted from a transmitter but also the ACK packet, and therefore, in a system accompanied by long-distance communication, a probability that the ACK packet does not reach the transmitter within the time-out period increases. Accordingly, in the system accompanied by long distance communication, a probability that the above-described communication control is executed increases and, even when communication reliability is ensured, communication efficiency might be reduced.

Then, there are cases where communication speed is increased using a wide area network (WAN) speed-increasing device. For example, WAN speed-increasing devices are arranged as a pair such that a WAN provided between locations between which communication with a long delay and a high discard rate is performed is interposed between the WAN speed-increasing devices, and increase the speed of communication between the locations using a unique protocol which is different from that of TCP communication. In this case, a transmitter transmits packets at a transmission rate which does not depend on an ACK packet but, in order not to cause congestion in the network between the WAN speed-increasing devices, the transmitter is controlled to transmit packets at a transmission rate in accordance with a usable bandwidth of the network. There might be cases where, if the transmitter continuously transmits packets without consideration of the usable bandwidth of the network, packet communication with a data amount exceeding an acceptable amount occurs in the network shared for another communication, and thus, congestion occurs in the network and thereby causes a packet loss in each communication.

In order to realize highly efficient and stable communication, circuit measurement in which a usable bandwidth which may be used in a network is executed and control of a transmission rate is performed.

For example, a technology in which, when the reception interval of measurement packets is equal to the transmission interval thereof, a transmission rate corresponding to the transmission interval is determined to be the usable bandwidth of a network has been known. Also, there has been another known technology in which, when a part of a plurality of packets burst-transmitted from a data transmitting unit is discarded, an output cycle of data burst is reduced in order to maintain a maximum output rate.

Japanese Laid-open Patent Publication No. 2011-182015, Japanese Laid-open Patent Publication No. 2006-74773, and Japanese Laid-open Patent Publication No. 2012-5087 describe the related techniques.

SUMMARY

According to an aspect of the invention, a communication system includes a transmitter configured to transmit a packet, a repeater configured to impose a bandwidth limit on the packet, a receiver configured to receive the packet on which the bandwidth limit is imposed, and a control device configured to set, when a reception interval of reception packets received by the receiver is longer than a transmission interval of packets transmitted to the repeater, a transmission rate in the transmitter in accordance with the reception interval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

According to examination conducted by the present inventor, packets are burst-transferred at a throughput exceeding the usable bandwidth of a network, depending on the accumulation amount of tokens in a repeater. When packets are transmitted in accordance with the bandwidth estimated in accordance at the throughput, packets exceeding the usable bandwidth are transmitted, and thus, a packet loss occurs in a network.

According to an embodiment described below, a packet loss is reduced in a communication system including a repeater that burst-transfers packets.

Figure 1:
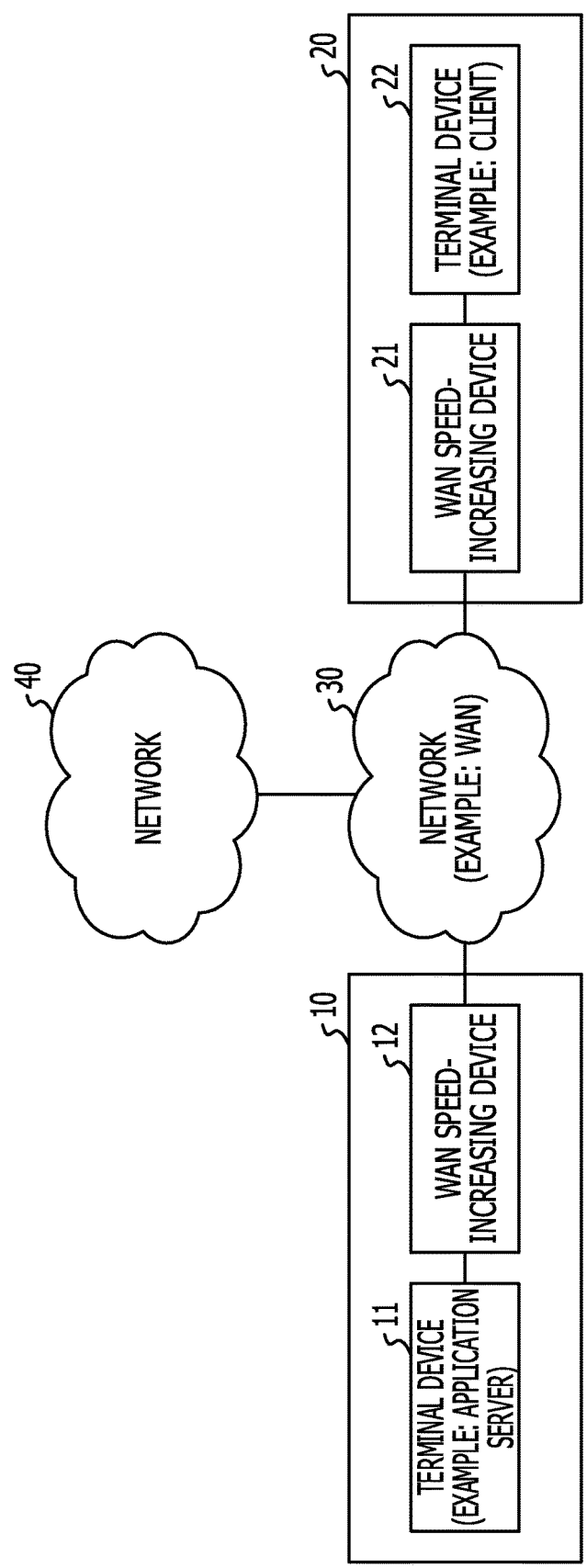
FIG. 1 is a diagram illustrating an example of a communication system according to an embodiment.

FIG. 1 is a diagram illustrating an example of a communication system according to the embodiment. The communication system illustrated in FIG. 1 includes a computer network 10 that includes a terminal device 11 and a WAN speed-increasing device 12, and a computer network 20 that includes a WAN speed-increasing device 21 and a terminal device 22. The terminal device 11 is, for example, an application server, and provides information corresponding to a request transmitted from the terminal device 22 serving as, for example, a client to the terminal device 22 via a network 30 serving, for example, as a WAN. Note that another network 40 may be connected to the network 30. The terminal device 11, the WAN speed-increasing device 12, the terminal device 22, and the WAN speed-increasing device 21 correspond to a transmitter or a receiver according to the embodiment in accordance with a communication direction when a communication control method according to the embodiment is executed.

The WAN speed-increasing device 12 and the WAN speed-increasing device 21 are arranged as a pair with the network 30 interposed therebetween in order to increase the speed of communication performed between the terminal device 11 and the terminal device 22. The WAN speed-increasing device 12 and the WAN speed-increasing device 21 use, for example, a unique protocol which is different from that of TCP communication, and thus, are operable as a proxy device that transmits packets at a transmission rate which does not depend on ACK packets. In this case, for communication of the WAN speed-increasing device 12 and the WAN speed-increasing device 21, in order not to cause congestion in the network 30, control is executed to cause packets to be transmitted at a transmission rate in accordance with the usable bandwidth of the network 30 in a manner described below.

Incidentally, in general, the network 30 is operated by a telecommunication carrier who is different from a business operator who operates the computer networks 10 and 20. The network 30 is used also by a business operator who operates another computer network (not illustrated). The business operator who operates the computer networks 10 and 20 constructs an exclusive communication line, such as a virtual private network (VPN), in the network 30 under a specific contract with the telecommunication carrier, and thereby, a bandwidth defined by the contract is ensured and then, the business operator may execute communication between the computer networks 10 and 20.

Figure 2:
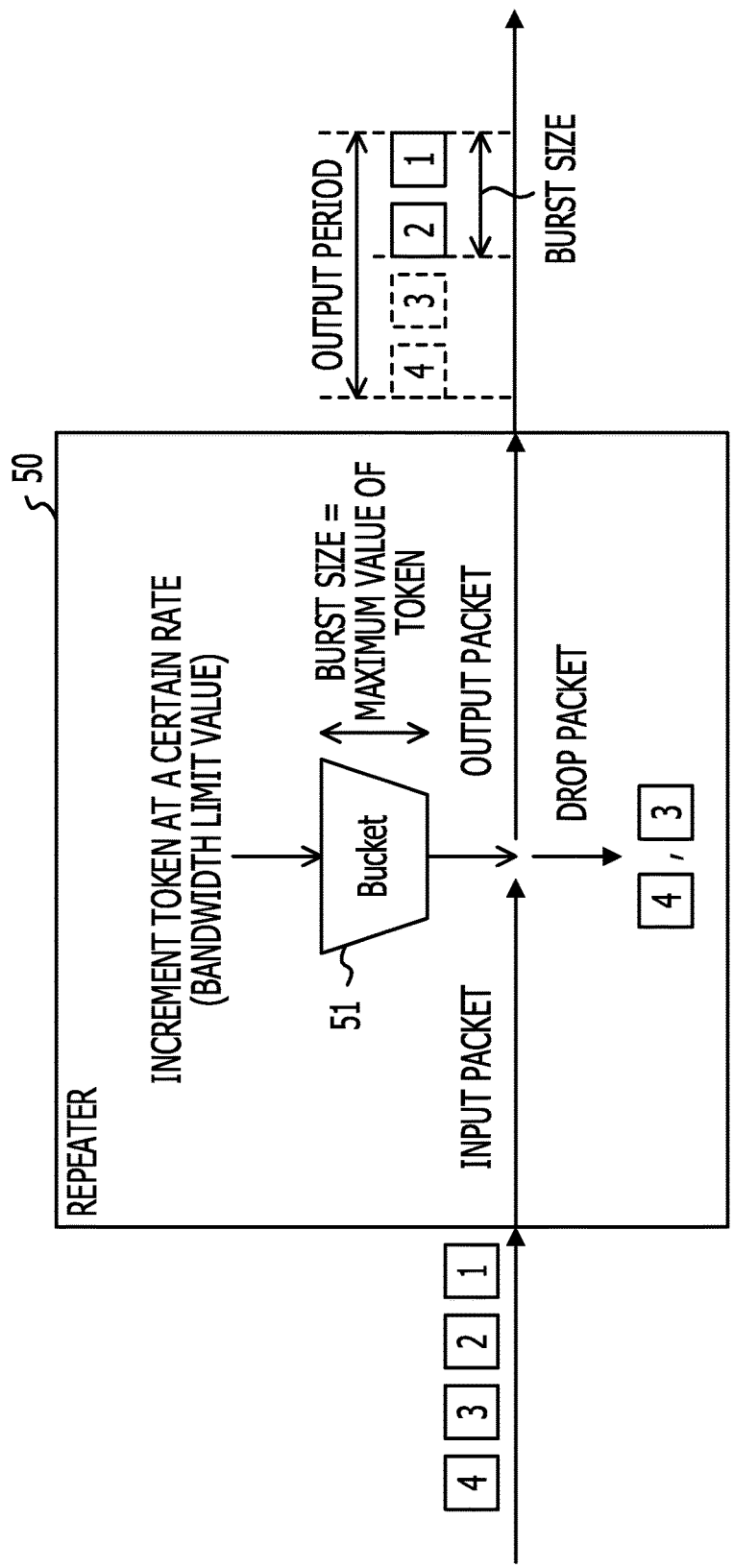
FIG. 2 is a diagram illustrating an example of communication performed in a repeater according to the embodiment.

FIG. 2 is a diagram illustrating an example of communication performed in a repeater according to the embodiment. A repeater 50 illustrated in FIG. 2 is a repeater, such as, for example, a router, included in the network 30 of FIG. 1, and has a packet processing function. The repeater 50 has, as the packet processing function, a function of burst-transferring an input packet on the basis of the accumulation amount of tokens accumulated in a token bucket 51. Note that tokens accumulated in the token bucket 51 are incremented at certain speed in accordance with a bandwidth limit.

For example, as illustrated in FIG. 2, assume that a packet string including four packets "1", "2", "3", and "4" which are successive in terms of time and for which an equal packet interval is given is input to the repeater 50. Also, assume that tokens are accumulated up to a maximum value of the token bucket 51 and that, when tokens are accumulated up to the maximum value of the token bucket 51, the repeater 50 may transfer the packets "1" and "2". In this case, the repeater 50 consumes all of the tokens accumulated in the token bucket 51 and burst-transfers the packets "1" and "2". Accordingly, the packet interval of the packets "1" and "2" output from the repeater 50 is equal to the packet interval at the inputs of the packets "1" and "2" to the repeater 50.

Incidentally, even when the packets "3" and "4" following the packets "1" and "2" are input to the repeater 50, the packets "3" and "4" are not output from the repeater 50 then, because there are not tokens for the packets "3" and "4" in the token bucket 51.

For example, when the repeater 50 has a policer function, the packets "3" and "4" are discarded. Note that, after the packet "3" is discarded, the tokens are incremented before the packet "4" is input to the repeater 50 and, if the amount of tokens is an amount with which the packet "4" may be transferred, the packet "4" is not discarded and is output from the repeater 50. FIG. 2 illustrates an example where the repeater 50 has a policer function, providing an example of output of packets when the packets "3" and "4" are discarded.

On the other hand, for example, when the repeater 50 has a shaper function, the packets "3" and "4" are buffered in the repeater 50 until tokens which allow transfer of the packets "3" and "4" are accumulated in the token bucket 51. That is, at least the packet interval at the output timing of the packets "2" and "3" is extended to be longer than the packet interval at the input timing of them.

Now, assume that the packets "1", "2", "3", and "4" are input to the repeater 50 at a rate exceeding the bandwidth limit and tokens are incremented at speed in accordance with the bandwidth limit in the repeater 50.

Depending on a communication situation before the packets "1", "2", "3", and "4" are input, because the tokens of the repeater 50 are not consumed and accumulated in the token bucket 51, as described above, even the packets "1" and "2" which are input at a rate exceeding the bandwidth limit are burst-transferred in the unchanged packet interval, and are output from the repeater 50. That is, although the packets "3" and "4" are discarded and thereby the packets are transferred at a throughput which meets the bandwidth limit in terms of time average, in a local period in which the packets "1" and "2" are transferred, the packets are output at a throughput exceeding the bandwidth limit.

Depending on change in the number of contacts of the business operators using the network 30, and the like, the telecommunication carrier might change the maximum value of the token bucket, the token size, and the increment speed for the existing business operators of the network 30 on the basis of the communication tendency of each business operator within the coverage for bandwidth defined by the corresponding contracts, and thereby perform management such that the network 30 becomes stable. In this case, because the coverage for bandwidth is defined by the contract, each business operator is not notified of such individual setting information by the telecommunication operator. That is, each business operator is not notified of the acceptable amount of the burst size of a repeater which is managed by the telecommunication operator.

When making a request for processing to an application server, each business operator does not precisely know the data amount transmitted from the application server in advance.

Therefore, each business operator does not know the burst size which is acceptable for the network 30, even when an exclusive communication line is provided in the network 30, and in this situation, it is preferable that transmission control for achieving a communication tendency in accordance with the burst size and the setting state of the bandwidth limit is executed such that a packet loss does not occur due to a local communication to thereby stabilize communication.

As a result of the examination of the above-described communication system conducted by the present inventor, when a repeater burst-transfers packets, if the transmission amount of measurement packets for use in measuring the usable bandwidth in accordance with the bandwidth limit is less than a burst size which is acceptable at that time, all of the measurement packets are burst-transferred. In this case, the interval of measurement packets received by a receiver is equal to the interval of packets input to the repeater, and the interval is not extended. That is, even when measurement packets are transmitted at a transmission rate exceeding the usable bandwidth, the packets might reach the receiver in the same packet interval as that at transmission. Thus, when the usable bandwidth is estimated in accordance with the interval of the measurement packets received by the receiver, a bandwidth greater than a bandwidth acceptable in the network is incorrectly estimated as the usable bandwidth.

In actual communication, there cases where a greater transmission amount of packets than the transmission amount of measurement packets is continuously transmitted. In this case, if packets are continuously transmitted at a transmission rate in accordance with the usable bandwidth incorrectly estimated, packets exceeding an acceptable burst size are continuously transmitted from a transmitter, and a congestion occurs in the network.

Note that what has been described above means that the burst size is an amount defined on the basis of the accumulation amount and maximum value of the token bucket of the repeater at that time and the usable bandwidth is a bandwidth in terms of time average, which depends on the speed of increment of tokens and the unit amount thereof, and therefore, there are cases where the usable bandwidth is not accurately measured by only using local communication relative to the accumulation amount of tokens depending on the communication situation in the past.

Also, even when the transmission amount of measurement packets is greater than the accepted burst size at that time, if, in spite that a part of received measurement packets is burst-transferred and thus a reception interval thereof is extended incidentally, the usable bandwidth is estimated using an average value of reception intervals of all of the received measurement packets, and the like, a bandwidth greater than a bandwidth acceptable in the network is accordingly estimated as the usable bandwidth.

The accumulation amount of tokens is an amount corresponding to a communication history of the network, and therefore, when packets are transmitted at a transmission rate in accordance with the usable bandwidth estimated in the manner described above, packets exceeding the bandwidth acceptable in the network are transmitted. That is, the repeater receives packets exceeding the burst size to thereby execute packet discard processing, packet retransmission control occurs, and communication efficiency is reduced. Also, because packets exceeding the usable bandwidth are input to the repeater, a probability that a packet loss is caused in another communication via the same repeater increases.

As described above, depending on the accumulation amount of tokens which varies in accordance with the communication history of the network, there is a period in which packets are burst-transferred at a throughput exceeding the usable bandwidth of the network. When circuit measurement is performed in accordance at the throughput of packets transferred in the period, a bandwidth exceeding the usable bandwidth of the network is incorrectly estimated as the usable bandwidth. When packets are transmitted in accordance with the incorrectly estimated usable bandwidth, a packet loss might occur in packets by which the usable bandwidth of the network is exceeded.

According to the embodiment, focusing on that, in a received packet string, the reception rate after the packet interval is extended to be longer than the transmission interval complies with the bandwidth limit after packets have been burst-transferred by the repeater, a boundary between a packet burst-transferred and a packet transferred in accordance with the bandwidth limit is determined using change in the reception rate and packet interval of the reception packet and a packet is transmitted in accordance with the reception rate of the packet transferred in accordance with the bandwidth limit, so that, even when the acceptable amount of burst transfer varies, a packet loss is reduced.

Figure 3:
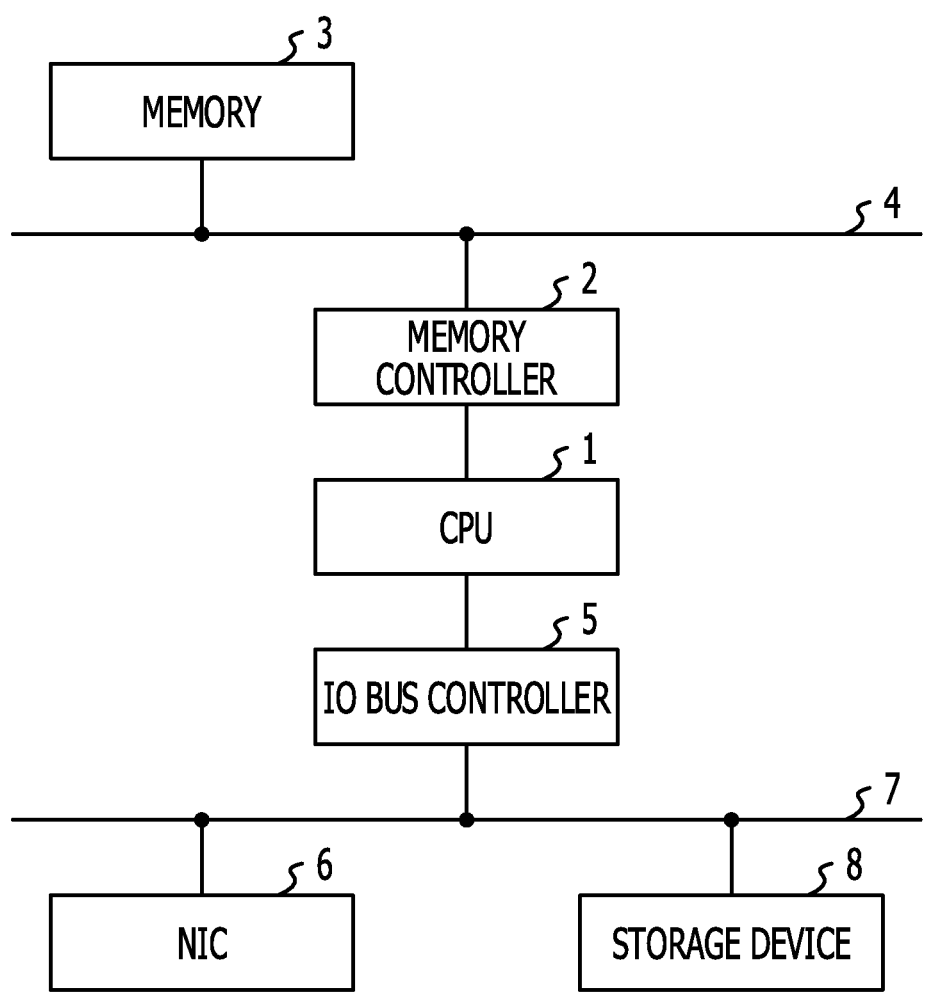
FIG. 3 is a diagram illustrating an example of a hardware configuration for a transmitter and a receiver according to the embodiment.

FIG. 3 is a diagram illustrating an example of a hardware configuration for a transmitter and a receiver according to the embodiment. As described above, each of the terminal device 11, the WAN speed-increasing device 12, the terminal device 22, and the WAN speed-increasing device 21 corresponding to the transmitter or the receiver according to the embodiment includes a CPU 1, a memory controller 2, a memory 3, a memory bus 4, an IO bus controller 5, an NIC 6, and an IO bus 7 in accordance with a communication direction when a communication control method according to the embodiment is executed, and a storage device 8 is connected to the IO bus 7.

In the memory 3 connected to the memory bus 4, a program that causes execution of various processes of the transmitter or the receiver according to the embodiment is stored. The CPU 1 reads out the program from the memory 3 via the memory controller 2 and executes various processes. As various processes are executed by the CPU 1, write and readout of data to and from the memory 3 are executed via the memory controller 2.

The CPU 1 transfers data to the NIC 6 connected to the IO bus 7 via the IO bus controller 5, and receives data and packets from the NIC 6. The CPU 1 reads out data from the storage device 8 connected to the IO bus 7 via the IO bus controller 5 and writes data to the storage device 8.

The CPU 1 may include one or more CPU cores for use in executing various processes. Also, the CPU 1 may include one or more processors. The memory 3 is, for example, a RAM, such as a dynamic random access memory (DRAM), and the like. The storage device 8 is, for example, a non-volatile memory, such as a read only memory (ROM), a flash memory, and the like, or a magnetic disk device, such as a hard disk drive (HDD), and the like.

Figure 5:
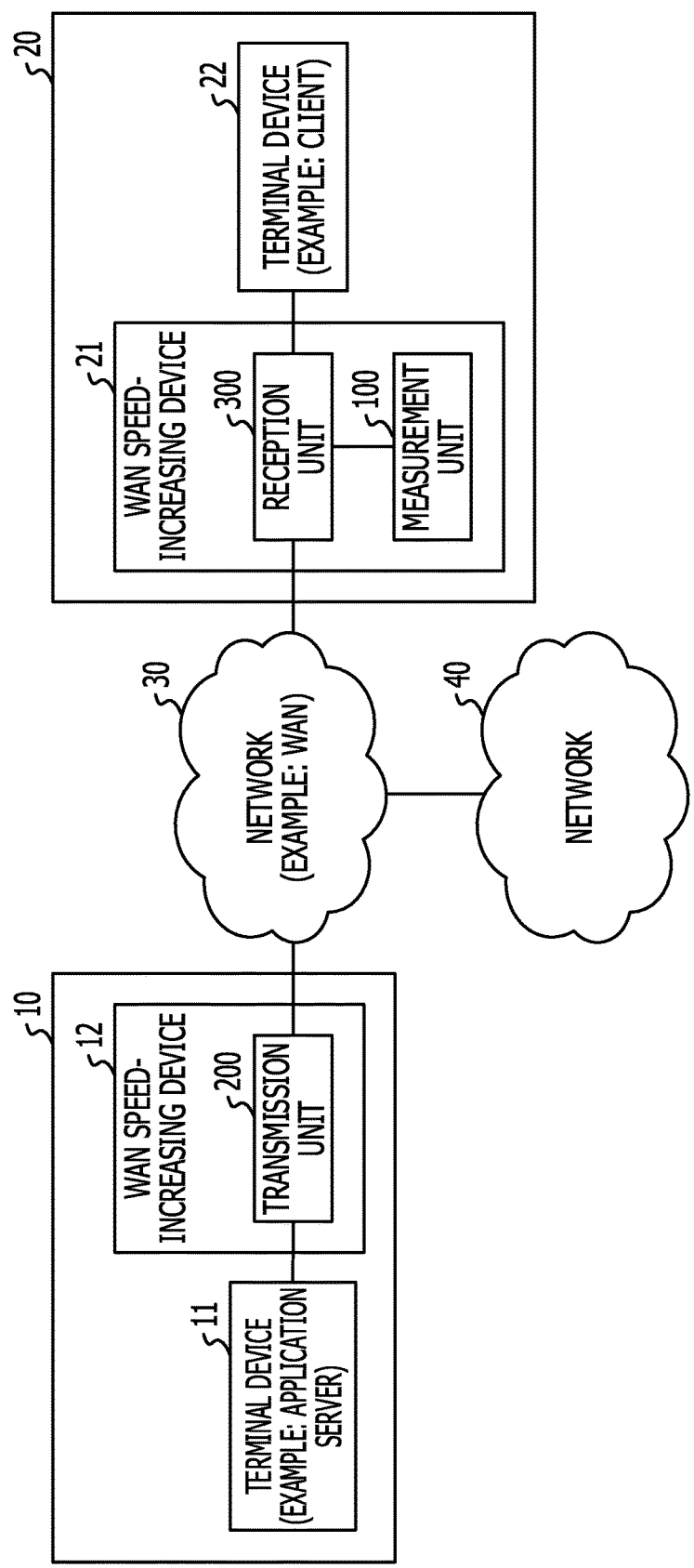
FIG. 5 is a diagram illustrating an example of application of a function block according to the embodiment.
Figure 6:
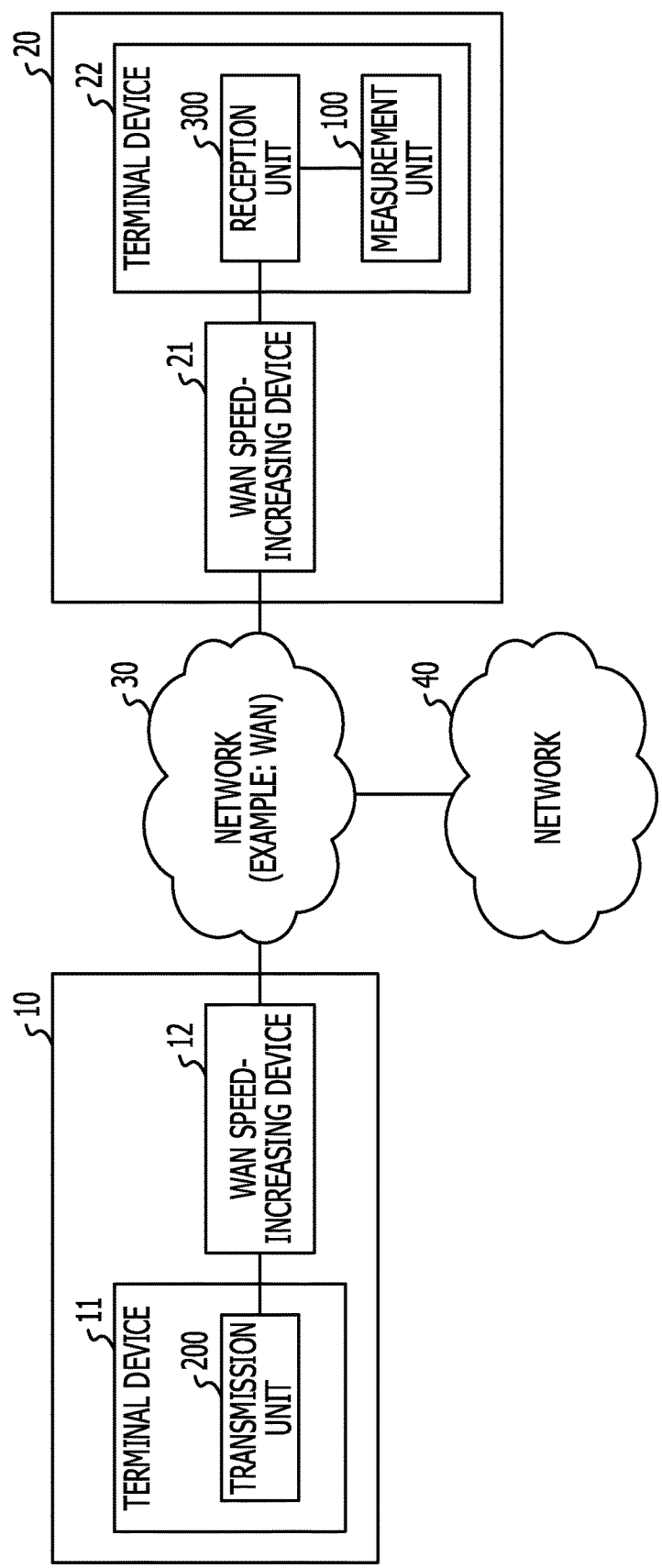
FIG. 6 is a diagram illustrating another example of application of a function block according to the embodiment.
Figure 9:
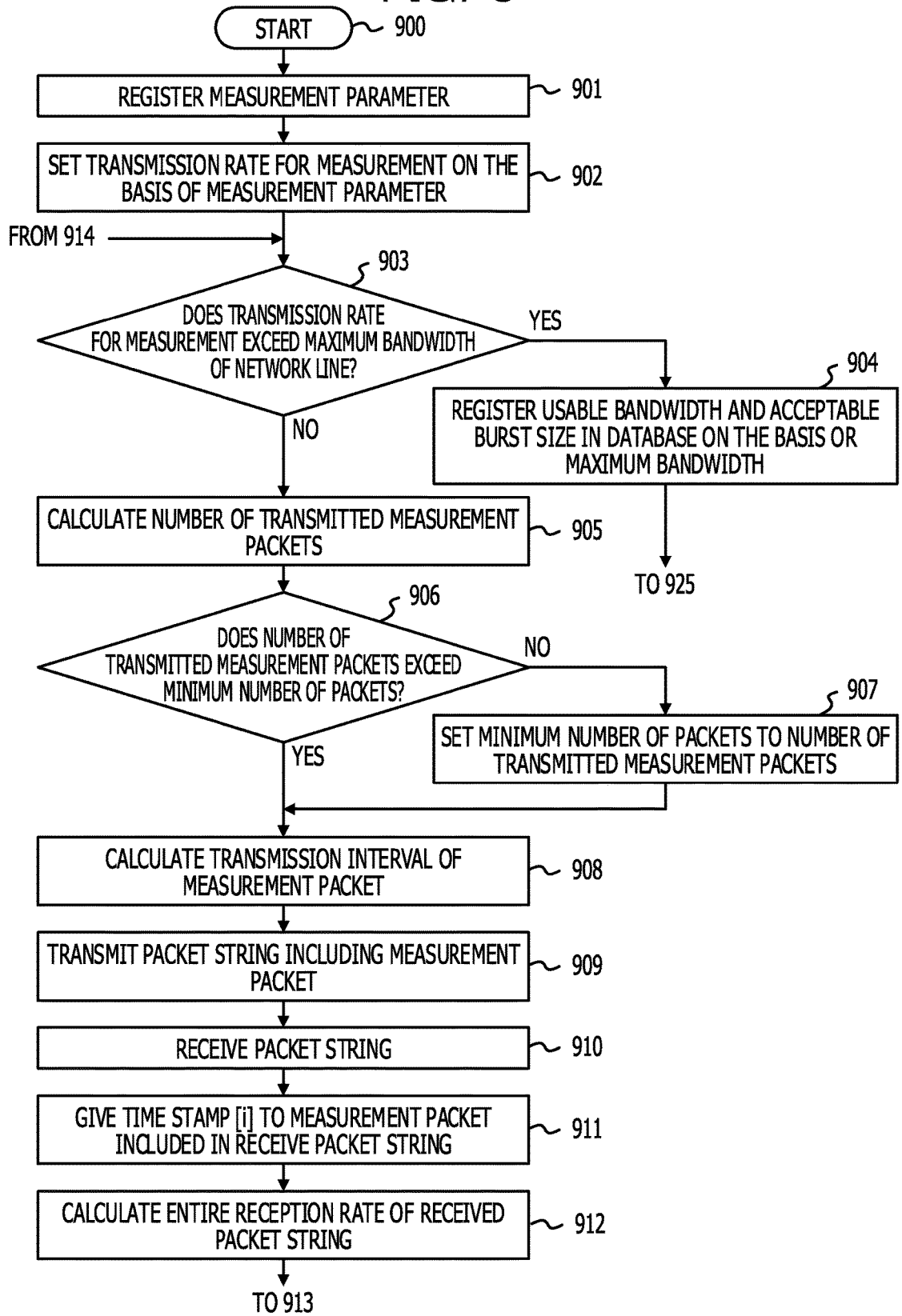
FIG. 9 is a flowchart of an example of processing executed in a communication control method according to the embodiment.
Figure 10:
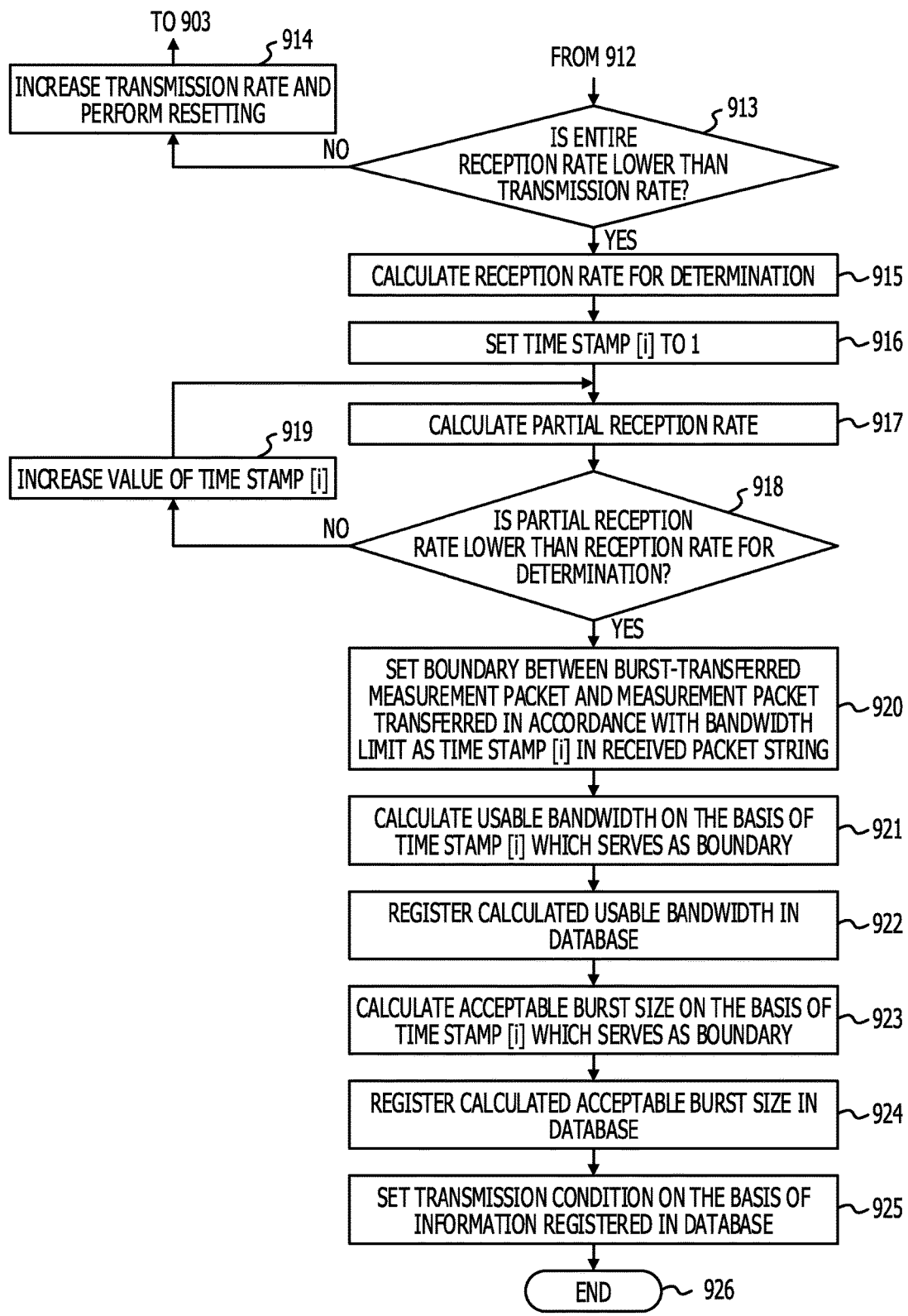
FIG. 10 is a flowchart of another example of processing executed in a communication control method according to the embodiment.

Note that the configuration in which the CPU 1, the memory controller 2, the memory 3, the NIC 6, and the storage device 8 are connected to the same bus may be applied to the transmitter and the receptor according to the embodiment. The function blocks illustrated in FIGS. 4-6 are realized by the hardware configuration illustrated in FIG. 3, and processing illustrated in FIG. 9 and FIG. 10 are executed.

Figure 4:
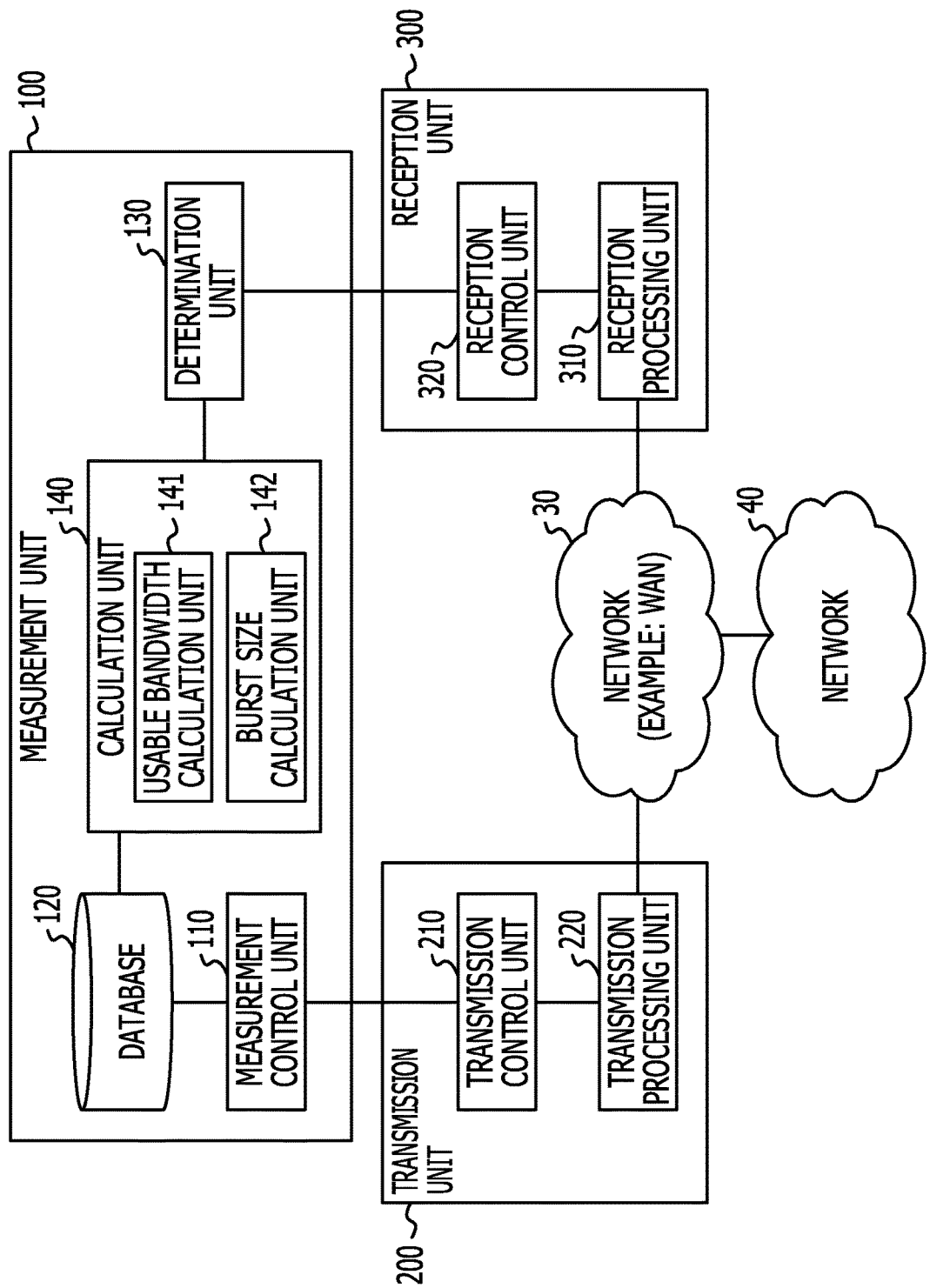
FIG. 4 is a diagram illustrating example function blocks applied to a transmitter and a receiver according to the embodiment.

FIG. 4 is a diagram illustrating example function blocks applied to the transmitter and the receiver according to the embodiment. In the transmitter and the receiver according to the embodiment, the program stored in the storage device 8 is loaded to the memory 3 used as a working memory. The program loaded in the memory 3 is executed by the CPU 1 to cause function blocks to function as a measurement unit 100, a transmission unit 200, and a reception unit 300. The measurement unit 100 is connectable to the transmission unit 200 and the reception unit 300, and the transmission unit 200 and the reception unit 300 are connectable to each other via the network 30. Note that the transmission unit 200 is included in the transmitter and the reception unit 300 is included in the receiver, but the measurement unit 100 may be included in either one of the transmitter and the receiver and also may be realized by another device that controls the transmitter and the receiver.

The measurement unit 100 includes a function block of a measurement control unit 110, a database 120, a calculation unit 140 including a usable bandwidth calculation unit 141 and a burst size calculation unit 142, and a determination unit 130. The transmission unit 200 includes a function block of a transmission control unit 210 and a transmission processing unit 220. The reception unit 300 includes a function block of a reception processing unit 310 and a reception control unit 320.

The transmission control unit 210, and the measurement control unit 110 included in the measurement unit 100 are examples of setting devices. The usable bandwidth calculation unit 141 is an example of a first calculation unit. The burst size calculation unit 142 is an example of a second calculation unit. The determination unit 130 included in the measurement unit 100 is an example of a determination device.

Note that application examples where each function block illustrated in FIG. 4 is applied to the communication system illustrated in FIG. 1 are illustrated in FIG. 5 and FIG. 6. The processing executed by each function block will be described below in correspondence to the processing illustrated in FIG. 9 and FIG. 10.

FIG. 5 is a diagram illustrating an example of application of a function block according to the embodiment. As illustrated in FIG. 5, the transmission unit 200 is realized by the WAN speed-increasing device 12 connected, for example, to an application server. In addition, the measurement unit 100 and the reception unit 300 are realized by the WAN speed-increasing device 21, for example, connected to a client terminal. For example, the WAN speed-increasing device 12 is the transmitter and the WAN speed-increasing device 21 corresponds to the receiver. Note that the measurement unit 100 may be realized by the WAN speed-increasing device 12, and the measurement unit 100 may be realized by another device that controls the WAN speed-increasing devices 12 and 21.

FIG. 6 is a diagram illustrating another example of application of a function block according to the embodiment. As illustrated in FIG. 6, the transmission unit 200 is realized by the terminal device 11 serving, for example, as an application server. In addition, the measurement unit 100 and the reception unit 300 are realized by the terminal device 22 serving, for example, as a client terminal. For example, the terminal device 11 is the transmitter and the terminal device 22 corresponds to the receiver. Note that the measurement unit 100 may be realized by the terminal device 22, and as another option, may be realized by another device that controls the terminal devices 11 and 22.

Figure 7:
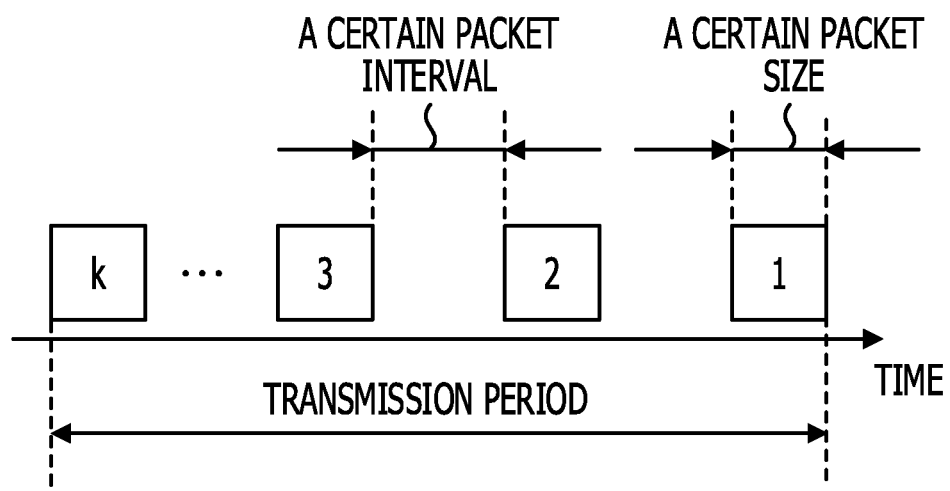
FIG. 7 is a diagram illustrating an example of a measurement packet which is transmitted from a transmitter and is input to a repeater according to the embodiment.

FIG. 7 is a diagram illustrating an example of transmission of a measurement packet which is transmitted from a transmitter and is input to a repeater according to the embodiment. The embodiment is not limited to the example illustrated in FIG. 7 but, for example, a measurement packet of a certain packet size is transmitted from the transmission unit 200 in a certain interval and is input to the repeater 50. At this time, in the transmission unit 200, a sequence number [k] is given to the measurement packet. Thus, a packet string including the measurement packet transmitted in the above-described manner is input to the repeater 50. Note that the transmission period of the measurement packet, the packet size of the measurement packet, the packet interval in accordance with the transmission rate of the measurement packet, and the like, are registered as measurement parameters in the database 120 by step 901 which will be described later.

Note that packet intervals of measurement packets in the packet string may not be equal to one another. The reason for this is that, because the boundary between a measurement packet burst-transferred by the repeater 50 and a measurement packet transferred in accordance with the bandwidth limit is determined, different transmission intervals of different transmission times are recorded and each of reception times whose reception intervals are different from the corresponding transmission intervals on the basis of the recorded transmission intervals may be determined as the boundary. For example, as long as the transmission rate which has been set is achieved, the transmission interval of measurement packets may be cyclically changed. Also, there are cases where a measurement packet which is actually transmitted includes a jitter which occurs in transmission processing and the like, and the jitter and the like may be added to measurement conditions used for determining the boundary.

Figure 8:
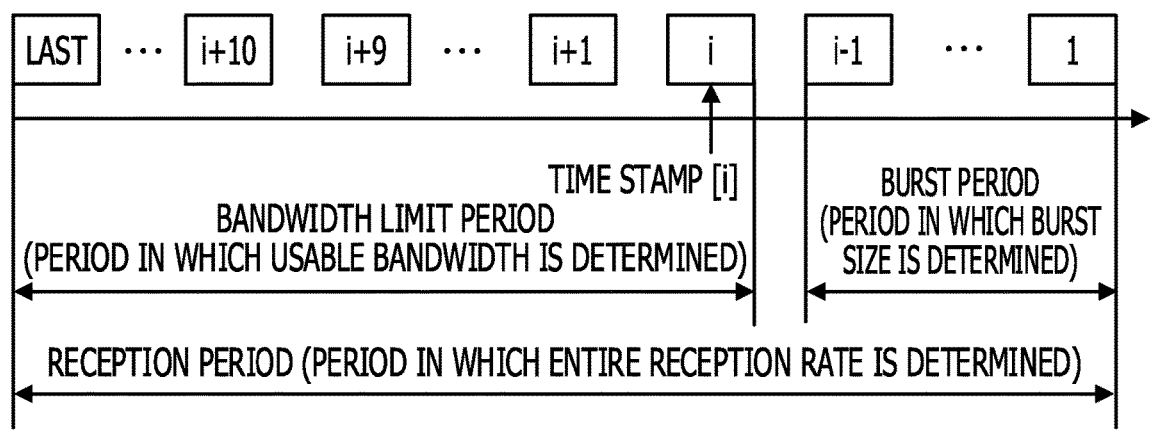
FIG. 8 is a diagram illustrating an example of reception of a measurement packet received by a receiver according to the embodiment.

FIG. 8 is a diagram illustrating an example of reception of a measurement packet received by a receiver according to the embodiment. A time stamp [i] is given to a reception packet, which is a received measurement packet, in chronological order of reception of packets. In the embodiment, not only the order of reception of packets but also information of reception time itself is given by the time stamp. Therefore, in the following description, the reception time, not the order of reception of packets, is indicated by [i] sometimes. Note that a received packet string includes all of measurement packets included in a transmitted packet string in some cases, while a received packet string does not include all of transmitted measurement packets due to a packet loss in the repeater 50 and the like in the network in other cases, and therefore, there are cases where the time stamp [i] does not correspond to the sequence number [k].

As illustrated in FIG. 8, a period of time which it takes to receive a packet string including measurement packets from a reception packet [1] to a reception packet [last] is a reception period, and an entire reception rate is determined in accordance with the number of packets received in the reception time. Note that the reception period includes a burst period and a bandwidth limit period, which will be described later, and the boundary of a burst-transferred measurement packet and a packet transferred in accordance with the bandwidth limit of the network is between a reception time [i−1] and a reception time [i].

A period in which measurement packets from the reception packet [1] to the reception packet [i−1] are received is a burst period, and a burst size is calculated in accordance with the number of packets received in the burst period. The interval of packets received in the burst period is basically equal to the interval in which the packets are transmitted from the transmission unit 200 and are input to the repeater 50, because the packets are burst-transferred by the repeater 50, and, in the burst period, the packet interval is not extended.

A period in which measurement packets from the reception packet [i] to the reception packet [last] are received is a bandwidth limit period, and the usable bandwidth is calculated in accordance with the number of packets received in the bandwidth limit period. Measurement packets received in the bandwidth limit period are measurement packets on which packet processing has been performed in accordance with tokens in the repeater 50, and thus, there are cases where the reception interval is extended to be longer than the transmission interval due to a packet drop, a packet buffering delay, or the like. Moreover, measurement packets themselves received in the bandwidth limit period are packets which have reached via the network, and therefore, a limit reception rate in the bandwidth limit period indicates the usable bandwidth. Then, a transmission rate in accordance with the limit reception rate is set for the transmission unit 200.

FIG. 9 is a flowchart of an example of processing executed in a communication control method according to the embodiment. The processing illustrated in FIG. 9 is executed by the CPU 1 in accordance with a program read out to the memory 3 included in the transmitter or the receiver. The processing illustrated in FIG. 9 is started with step 900.

A step 901 of registering measurement parameters is executed by the measurement control unit 110. In the step 901, an initial value of the transmission rate for measurement, a transmission period for measurement, the size of a measurement packet, and the like, are registered in the database 120. Note that the initial value of the transmission rate for measurement is preferably registered under the condition where the initial value is less than the maximum bandwidth of a network line.

A step 902 of setting the transmission rate for measurement is executed by the measurement control unit 110 on the basis of the registered parameters. In the step 902, the initial value of the transmission rate for measurement registered in the database 120 is set.

A step 903 of determining whether or not the transmission rate for measurement which has been set exceeds the maximum bandwidth of the network line is executed by the measurement control unit 110. In the step 903, for example, an acceptable bandwidth (for example, 1 Gbps, 10 Gbps, or the like) of a network interface card (NIC) of a communication circuit included in a repeater and the like provided in a device in the network is set as the maximum bandwidth of the network line and the maximum bandwidth which has been set is compared to the transmission rate for measurement set by the step 902 or a step 914 to determine whether or not the transmission rate for measurement which has been set exceeds the maximum bandwidth of the network line. In the step 903, if it is determined that the transmission rate for measurement which has been set exceeds the maximum bandwidth of the network line, the process proceeds to a step 904, and, if it is determined that the transmission rate for measurement which has been set does not exceed the maximum bandwidth of the network line, the process proceeds to a step 905.

The step 904 in which the usable bandwidth and the acceptable burst size corresponding to the maximum bandwidth of the network line are registered in the database 120 is executed by the measurement control unit 110. The step 904 is a step executed when it is determined by the step 903 that the maximum bandwidth of the network may be used as the usable bandwidth of the network and a packet loss does not occur even when packets are transmitted in accordance with the maximum bandwidth. Therefore, for example, when the maximum bandwidth of the network line is set to 10 Gbps, the usable bandwidth is set to 10 Gbps. In this case, if acceptable time for burst transfer is one second, the acceptable burst size is set to 10 Gbit. When the step 904 is ended, the process proceeds to a step 925.

The step 905 of calculating the number of measurement packets is executed by the transmission control unit 210. In the step 905, for example, a data amount transmitted in the registered transmission period is calculated by multiplication of the transmission rate for measurement which has been set and the registered transmission period. The calculated data amount is divided by the registered measurement packet size, and thereby, the number of packets with which the transmission rate is achieved in the registered transmission period is calculated.

A step 906 of determining whether or not the number of transmitted measurement packets exceeds the minimum number of packets is executed by the transmission control unit 210. In the step 906, the number of transmitted measurement packets calculated in the step 905 is compared to, for example, the minimum number of packets which has been set, that is, 100. In this case, if the number of transmitted measurement packets does not exceed 100 packets, the process proceeds to a step 907 and, if the number of transmitted measurement packets exceeds 100 packets, the process proceeds to a step 908. Note that the embodiment is not limited to 100 packets, the minimum number of packets in accordance with a network configuration which serves as a measurement target and circuit measurement may be set.

A step 907 of setting the minimum number of packets as the number of transmitted measurement packets is executed by the transmission control unit 210. In the step 907, in the above-described example, the number of transmitted measurement packets is set to, for example, 100.

A step 908 of calculating the transmission interval of measurement packet is executed by the transmission control unit 210. In the step 908, for example, the registered transmission period is divided by the number of transmitted measurement packets and thereby the transmission interval of a measurement packet is calculated. If measurement packets corresponding to the number with which the transmission rate which has been set is achieved are transmitted in the registered transmission period, the transmission intervals of measurement packets may not be equal to one another. For example, the transmission interval of measurement packets may be cyclically changed, or may include a random change. The measurement unit 100 that determines the boundary between a burst-transferred measurement packet of measurement packets and a measurement packet thereof which has not been burst-transferred is informed of information regarding the transmission interval in which measurement packets are transmitted as well as the sequence number [k] of the measurement packets.

In the embodiment, focusing on that the packet interval of measurement packets burst-transferred by the repeater is not changed and measurement packets which are output from the repeater immediately after the measurement packets have been transferred are output in a changed packet interval, the boundary between the burst-transferred measurement packets and the measurement packets which have not been burst-transferred is determined. When the boundary is determined, a change point between the transmission interval of measurement packets and the reception interval thereof may be determined, and therefore, the transmission intervals of transmitted measurement packets may not be equal to one another. Note that, as will be described later, a change point of the reception rate for every specific number of received measurement packets may be determined as a boundary of burst transfer and, in this case, measurement packets are transmitted in an equal interval.

A step 909 of transmitting a packet string including measurement packets is executed by the transmission processing unit 220. In the step 909, in the registered transmission period, measurement packets of the registered packet size are transmitted for each transmission period calculated in the step 908. The number of transmitted measurement packets is the number of transmitted packets calculated in the step 905 or the minimum number of packets set in the step 907. Measurement packets corresponding to the packet number are included in the packet string. Note that, in the transmission processing unit 220, the sequence number [k] is given to the measurement packets and a delimiter packet indicating the end of the packet string is transmitted in the end of the packet string.

A step 910 of receiving a packet string is executed by the reception processing unit 310.

A step 911 of giving the time stamp [i] to measurement packets included in the received packet string is executed by the reception control unit 320. In step 911, the time stamp [i] is given in chronological order of reception of packets. In the embodiment, not only the order of reception of packets but also information of reception time is added when the time stamp is given. Therefore, in the following description, there are cases where the reception time, not the order of reception of packets, is indicated as the reception time [i]. Note that, because there are some cases where a received packet string includes all of measurement packets included in a transmitted packet string, while there are other cases where a received packet string does include all of transmitted measurement packets due to a packet loss in the repeater 50 and the like in the network, there are cases where the time stamp [i] does not correspond to the sequence number [k].

A step 912 of calculating the entire reception rate of the received packet string is executed by the calculation unit 140. In the step 912, the entire reception rate is calculated on the basis of the time stamp [i], and the entire reception rate also illustrated in FIG. 8 is calculated on the basis of the number of measurement packets received in the calculated reception period and the packet size.

FIG. 10 is a flowchart of another example of processing executed in a communication control method according to the embodiment. In the example of processing illustrated in FIG. 10 is processing executed following the above-described processing illustrated in FIG. 9.

A step 913 of determining whether or not the entire reception rate is lower than the transmission rate which has been set is executed by the determination unit 130. In the step 913, the entire reception rate calculated by the step 912 and the transmission rate set by the transmission control unit 210 are compared to each other and thereby the determination is executed. In the step 913, if it is determined that the entire reception rate is not lower than the transmission rate which has been set, the process proceeds to a step 914 and, if it is determined that the entire reception rate is lower than the transmission rate, the process proceeds to a step 915. In the embodiment, the boundary between a burst-transferred measurement packet and a measurement packet transferred in accordance with the bandwidth limit is determined. However, when the entire reception rate is not lower than the transmission rate which has been set, packets have been transferred with no bandwidth limit being imposed, and therefore, the transmission rate is increased such that a bandwidth limit is imposed and remeasurement is executed to determine the above-described boundary.

A step 914 of increasing the transmission rate and performing resetting is executed by the measurement control unit 110. In the step 914, the setting value is increased, for example, by multiplying the transmission rate which has been set by a specific number or adding a specific value thereto. When the step 914 is ended, the process proceeds to the step 903.

A step 915 of calculating a reception rate for determination is executed by the calculation unit 140. In the step 915, for example, the average value of the entire reception rate calculated by the step 912 and the transmission rate set by the transmission control unit 210 is calculated as the reception rate for determination.

Incidentally, because the packet interval of a burst-transferred measurement packet is not extended, the measurement packet in the same interval as that of the transmission interval is received. That is, the measurement packet is received at the same rate as the transmission rate. On the other hand, because the entire reception rate calculated by the step 912 is a reception rate determined by not only measurement packets of reception packets, which are received in a period in which the bandwidth limit is imposed, but also measurement packets thereof, which are received in a period in which burst transfer is performed, the entire reception rate depends on the reception period and the packet size and is higher than the reception rate in accordance with the bandwidth limit. The embodiment is not limited to the reception rate for determination but, the above-described reception rate for determination is used in order to determine the reception time of a measurement packet received in a longer interval than the transmission interval, that is, the boundary between a burst-transferred measurement packet and a measurement packet transferred in accordance with the bandwidth limit.

A step 916 of setting the time stamp [i] to 1 is executed by the calculation unit 140.

A step 917 of calculating a partial reception rate is executed by the calculation unit 140. In the step 917, "j" that determines a target period of the partial reception rate is set. For a part of measurement packets, the partial reception rate is calculated on the basis of a period from the reception time [i+j] to the reception time [i], the number "J+1" of measurement packets received in the period, and the packet size which has been set.

A step 918 of determining whether or not the partial reception rate is lower than the reception rate for determination is executed by the determination unit 130. In the step 918, the partial reception rate calculated by the step 917 and the reception rate for determination calculated by the step 915 are compared to each other. When the partial reception rate is lower than the reception rate for determination, a measurement packet received in a longer interval than the transmission interval has been specified. That is, the boundary between a burst-transferred measurement packet and a measurement packet transferred in accordance with the bandwidth limit has been specified. The reception time [i] when this condition is satisfied is assumed to be a boundary time. In the step 918, if it is determined that the partial reception rate is not lower than the reception rate for determination, the process proceeds to a step 919 and, if it is determined that the partial reception rate is lower than the reception rate for determination, the process proceeds to a step 920.

A step 919 of increasing the value of the time stamp [i] is executed by the calculation unit 140. In the step 919, for example, the value of the time stamp [i] is increased by one.

A step 920 of setting, in the received packet string, the boundary between a burst-transferred measurement packet and a measurement packet transferred in accordance with the bandwidth limit as the time stamp [i] is executed by the calculation unit 140. Note that setting of the boundary is not limited to determination performed in the step 918 but, in the received packet string, the packet intervals of received measurement packets may be measured, the measured packet intervals may be compared to the corresponding transmission intervals to specify reception time at which the packet interval is extended, and the specified reception time may be set as the boundary. As another option, the packet intervals of received measurement packets may be measured, the reception time at which a packet interval, among the measured packet intervals, is extended to be longer than a packet interval that serves as a reference by a specific amount (for example, so as to be the double of the reference packet interval) may be specified, and the specified reception time may be set as the boundary.

A step 921 of calculating the usable bandwidth of the network on the basis of the time stamp [i] which serves as the boundary is executed by the usable bandwidth calculation unit 141. In the step 921, a reception period from the reception time [i] to the time at which the last measurement packet of the packet string is received, the number of measurement packets received in the reception period, and the registered packet size, the limit reception rate corresponding to the reception period is calculated. Measurement packets received at and after the reception time [i] are packets which have been transferred in accordance with the bandwidth limit after burst transfer was performed, and therefore, if packets are transmitted in accordance with the limit reception rate, even when the acceptable amount for burst transfer is changed, communication in which a packet loss does not occur is achieved. That is, the limit reception rate may be set as the usable bandwidth of the network.

A step 922 of registering the calculated usable bandwidth in the database is executed by the calculation unit 140. The usable bandwidth is registered in the database 120 by the step 922.

A step 923 of calculating the acceptable burst size on the basis of the time stamp [i] which serves as the boundary is executed by the burst size calculation unit 142. In the step 923, the burst reception rate is calculated on the basis of the period from the reception time [1] to the reception time [i−1] in the packet string, the number "i−1" of packets received in the period, and the registered packet size. Then, the acceptable burst size is calculated by multiplying a difference obtained by subtracting the limit reception rate from the burst reception rate by the reception period from the reception time [1] to the reception time [i−1]. Note that the acceptable burst size corresponds to the area of a part surrounded by an alternate long and short dash line in FIG. 12 which will be described later.

A step 924 of registering the calculated acceptable burst size in the database is executed by the calculation unit 140. The acceptable burst size is registered in the database 120 by the step 924.

A step 925 of setting a transmission condition on the basis of information registered in the database is executed by the transmission control unit 210. In the step 925, the transmission control unit 210 is notified of the usable bandwidth calculated in the step 921 and the acceptable burst size calculated in the step 923 from the measurement control unit 110 and the transmission condition is set by the transmission control unit 210 serving as a setting device. Thus, the transmission unit 200 transmits packets at a transmission rate which complies with the usable bandwidth of the network, and communication is executed in a highly efficient and stable manner.

Figure 11:
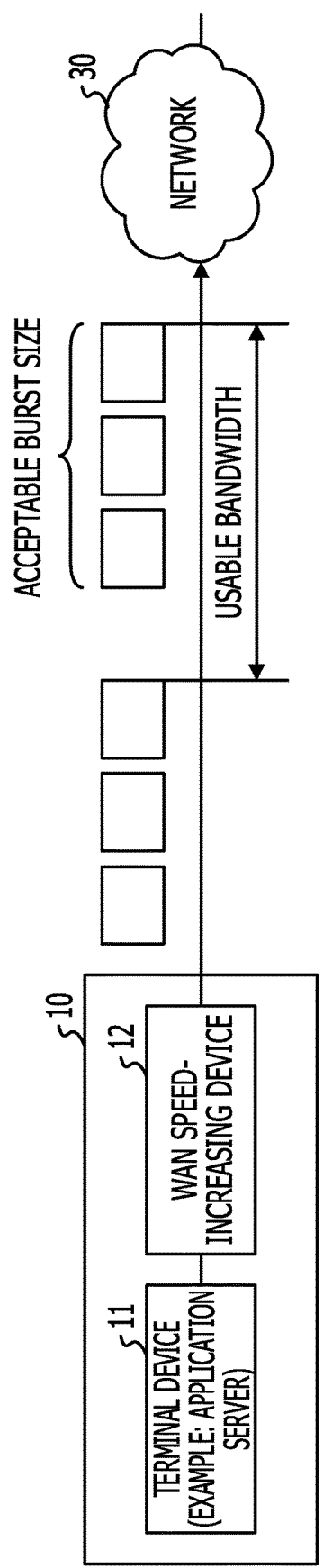
FIG. 11 is a diagram illustrating example transmission of a packet transmitted from a transmitter according to the embodiment.

Note that, as in the example of transmission of a packet in accordance with the acceptable burst size illustrated in FIG. 11, for example, packets in accordance with the acceptable burst size may be continuously transferred in each period determined on the basis of the usable bandwidth in accordance with the transmission condition set by the step 925. This is a transmission control in which, after packets in accordance with the acceptable burst size are continuously transmitted, a standby state is held for a period determined by the usable bandwidth, and packets in accordance with the acceptable burst size are continuously transmitted again. Even when packets are transmitted in accordance with the above-described transmission control, a packet exceeding the usable bandwidth in terms of time average is not transmitted, and thus, communication in the range accepted by the network is executed.

Figure 12:
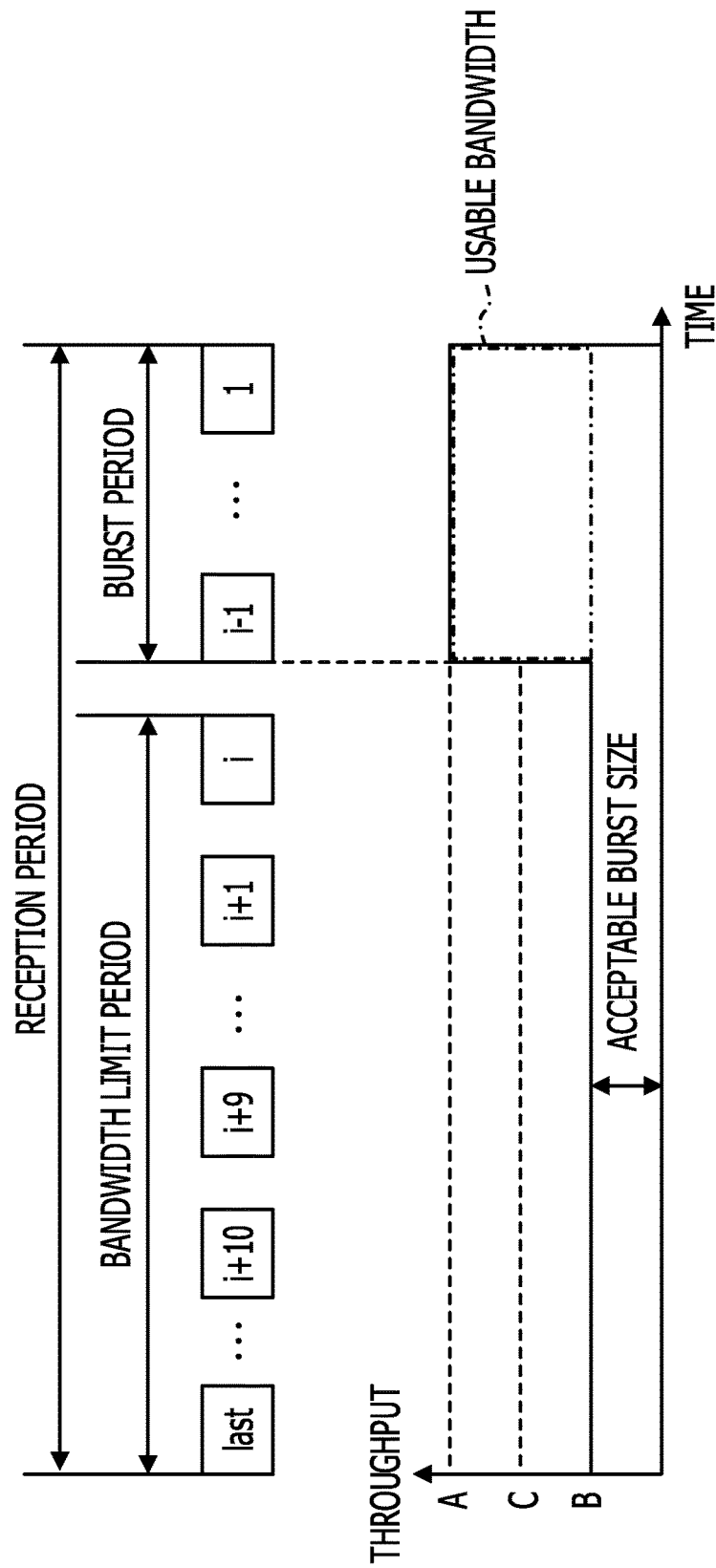
FIG. 12 is a diagram illustrating the relationship between a measurement packet received by a receiver according to the embodiment, a burst size, and a usable bandwidth.

FIG. 12 is a diagram illustrating the relationship between a received measurement packet, a burst size, and a usable bandwidth. In FIG. 12, change with time of the throughput which serves as the reception rate in each reception period in the packet string illustrated in FIG. 8 is illustrated.

The throughput in the burst period from the reception time [1] to the reception time [i−1] corresponds to a value represented by A on the ordinate axis of the graph illustrating change with time of the throughput, and the value is the above-described burst reception rate. The burst size is the area of a part surrounded by the alternate long and short dash line, and the area is calculated by the step 923 of FIG. 10.

After packets corresponding to the burst size indicated by the alternate long and short dash line of FIG. 12 have been transferred, packets are transferred in the bandwidth limit of the repeater. That is, even when packets are transmitted at a transmission rate equal to or higher than the bandwidth limit of the repeater, the packets are received at a throughput on which the bandwidth limit is imposed. Therefore, the value B which is a throughput of packets that have been transferred within the bandwidth limit corresponds to the usable bandwidth. The value represented by B is calculated using the limit reception rate in the step 921 of FIG. 10. Note that the reception rate for determination calculated by the step 915 of FIG. 10 corresponds to a value represented by C on the ordinate axis of the graph indicating change with time of the throughput.

According to the embodiment, focusing on that the reception rate after the packet interval is extended to be longer than the transmission interval in a received packet string follows the bandwidth limit after packets have been burst-transferred by the repeater, the boundary between a burst-transferred packet and a packet transferred in accordance with the bandwidth limit is determined using the reception rate of reception packets and change in the packet interval and packets are transmitted in accordance with the reception rate of packets transferred in accordance with the bandwidth limit, thereby reducing the packet loss even when the accepted amount of the burst transfer is changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication system, comprising:
   a transmitter including a first hardware processor configured to:
     transmit a plurality of packets at specified transmission intervals;
   a relay device including a second hardware processor configured to:
     receive the plurality of packets from the transmitter; and
     forward the plurality of packets;
   a receiver including a third hardware processor configured to:
     receive the plurality of packets from the relay device; and
   a control device including a fourth hardware processor configured to:
     detect a second period in which a second plurality of packets from among the plurality of transmitted packets are received by the receiver at second reception intervals that are longer than the specified transmission intervals, the second period following after a first period in which a first plurality of packets from among the plurality of transmitted packets are received by the receiver at first reception intervals that are the same as the specified transmission intervals; and
     adjust a transmission rate in the transmitter based on a difference between a length of the second reception intervals and a length of the first reception intervals.

2. The communication system according to claim 1, wherein the second hardware processor is configured to:
   perform burst-transferring in the forwarding for a part of the plurality of packets.

3. The communication system according to claim 1, wherein the control device is configured to calculate, on the basis of a reception rate before reception of the reception packets in a packet string received by the receiver, which is received in an interval longer than the transmission interval, a transfer size of packets transferred by the relay device.

4. The communication system according to claim 3, wherein the control device is configured to cause continuous transfer of packets corresponding to a transfer size to be performed in each period calculated by multiplying the transmission rate by the transfer size.

5. The communication system according to claim 1, wherein the control device is configured to set, when the second reception intervals are not longer than the transmission interval, the transmission rate for the packets transmitted to the repeater such that the second reception intervals are longer than the transmission interval.

6. The communication system according to claim 1, wherein the control device is configured to determine that a reception interval is longer than the transmission interval by determining a boundary between a first packet of a packet string received by the receiver, which has been burst-transferred in the relay device and a second packet thereof.

7. The communication system according to claim 1, wherein the control device is configured to calculate a reception rate corresponding to each of a specific number of reception packets in a packet string received by the receiver which are sequentially received after a specific reception time and to determine, on the basis of reception time at which the reception rate is changed in the calculated plurality of reception rates, that a reception interval is longer than the transmission interval.

8. The communication system according to claim 1, wherein the control device is configured to determine that a reception interval is longer than the transmission interval by calculating an interval of reception packets between every adjacent reception time of adjacent packets in a packet string received by the receiver as shifting a reception time.

9. A communication controller connectable to a transmitter, the transmitter including a first hardware processor configured to transmit a plurality of packets at specified transmission intervals, the communication controller comprising:
   a memory; and
   a second hardware processor coupled to the memory and configured to execute a process, the process including:
   setting a transmission rate in the transmitter in accordance with a reception interval of reception packets received by a receiver, when the reception interval is longer than a transmission interval of packets transmitted to a relay device which imposes a bandwidth limit on a packet which is transmitted by the transmitter by:
     detecting a first period in which a second plurality of packets from among the plurality of transmitted packets are received by the receiver at first reception intervals that are longer than specified transmission intervals at which the transmitter transmits packets, the first period following after a second period in which a first plurality of packets from among the plurality of transmitted packets are received by the receiver at second reception intervals that are the same as the specified transmission intervals, and
     adjusting the transmission rate in the transmitter based on a difference between a length of the second reception intervals and a length of the first reception intervals.

10. A communication control method executed by a computer, comprising:

setting a transmission rate in a transmitter in accordance with a reception interval of reception packets received by a receiver, when the reception interval is longer than a transmission interval of a plurality of packets transmitted to a relay device which imposes a bandwidth limit on a packet which is transmitted by the transmitter by:

detecting a first period in which a second plurality of packets from among the plurality of transmitted packets are received by the receiver at first reception intervals that are longer than specified transmission intervals at which the transmitter transmits packets, the first period following after a second period in which a first plurality of packets from among the plurality of transmitted packets are received by the receiver at second reception intervals that are the same as the specified transmission intervals, and adjusting the transmission rate in the transmitter based on a difference between a length of the second reception intervals and a length of the first reception intervals.

11. A non-transitory computer-readable recording medium having stored therein a program for causing a computer to execute a digital signature process, the digital signature process comprising:

setting a transmission rate in a transmitter in accordance with a reception interval of reception packets received by a receiver, when the reception interval is longer than the transmission interval of a plurality of packets transmitted to a relay device which imposes a bandwidth limit on a packet which is transmitted by the transmitter by:

detecting a first period in which a second plurality of packets from among the plurality of transmitted packets are received by the receiver at first reception intervals that are longer than specified transmission intervals at which the transmitter transmits packets, the first period following after a second period in which a first plurality of packets from among the plurality of transmitted packets are received by the receiver at second reception intervals that are the same as the specified transmission intervals, and adjusting the transmission rate in the transmitter based on a difference between a length of the second reception intervals and a length of the first reception intervals.

12. A communication control method executed by a computer, the method comprising:

comparing a transmission interval and a reception interval of a relay device; and setting a transmission rate in a transmitter based on a reception interval of a receiver having a bandwidth limit responsive to the comparing by:

detecting a first period in which a second plurality of packets from among a plurality of packets are received by the receiver at first reception intervals that are longer than specified transmission intervals at which the transmitter transmits packets, the first period following after a second period in which a first plurality of packets from among the plurality of packets are received by the receiver at second reception intervals that are the same as the specified transmission intervals, and adjusting the transmission rate in the transmitter based on a difference between a length of the second reception intervals and a length of the first reception intervals.

13. The communication control method according to claim 12, wherein the transmission rate is set when the reception interval is longer than the transmission interval of the relay device.

14. The communication control method according to claim 12, wherein the relay device is a burst relay device.

15. The communication control method according to claim 12, wherein the transmission rate is set responsive to burst size and usable bandwidth.

16. The communication control method according to claim 12, wherein a boundary between a packet burst and a bandwidth limit packet transfer is determined using a change in reception rate and reception interval and a packet is transferred responsive to the bandwidth limit.

17. The communication control method according to claim 12, wherein the reception interval is based on burst packets received by the relay device.

* * * * *